United States Patent [19]

Zucker et al.

[11] 4,414,330

[45] Nov. 8, 1983

[54] PROCESS FOR CONTINUOUSLY GRINDING AND MIXING STARCH-CONTAINING RAW MATERIALS

[75] Inventors: Friedrich J. Zucker; Georg Osthaus; Klaus Fisch, all of Neuss, Fed. Rep. of Germany

[73] Assignee: Supraton F. J. Zucker GmbH, Fed. Rep. of Germany

[21] Appl. No.: 293,229

[22] Filed: Aug. 17, 1981

[30] Foreign Application Priority Data

Jun. 30, 1981 [DE] Fed. Rep. of Germany ....... 3125566

[51] Int. Cl.³ .......................... C12C 1/00; C12P 19/20; C12P 7/06; C13K 1/06
[52] U.S. Cl. ....................................... 435/93; 435/96; 435/161; 127/38
[58] Field of Search ................... 435/93, 96, 161, 162; 127/38

[56] References Cited

U.S. PATENT DOCUMENTS 3,236,740 2/1966 Smith et al. .......................... 435/161
4,255,518 3/1981 Muller et al. ........................ 435/161
4,286,058 8/1981 Wenger et al. ....................... 435/99

FOREIGN PATENT DOCUMENTS 2918212 11/1980 Fed. Rep. of Germany .
2944483 5/1981 Fed. Rep. of Germany .

*Primary Examiner*—Lionel M. Shapiro
*Attorney, Agent, or Firm*—Merriam, Marshall & Bicknell

[57] ABSTRACT

Starch-containing raw materials for the saccharification can be ground at a higher rate and with more economy of energy by mashing the material with hot water, pre-gelatinizing it and then grinding it in the shearing field of a rotor-stator machine having intermeshing radial surfaces. Preferably, enzymes are added already to the mash and hot stillage is used as hot water. Starting material having different grain sizes is previously screened and introduced into the process at different points.

4 Claims, No Drawings

PROCESS FOR CONTINUOUSLY GRINDING AND MIXING STARCH-CONTAINING RAW MATERIALS

This invention relates to a process for continuously grinding and mixing starch-containing raw materials for the saccharification. The saccharified starch is used especially for the production of alcohol.

BACKGROUND OF THE INVENTION

As is known, the starch contained in starch-containing raw materials, especially cereals and maize grains, must be made accessible by sufficiently crushing the grains. Therefore, it is necessary and usual to subject these raw materials previously to grinding. This dry grinding of grainy starch raw materials to form a fine flour involves a high expenditure of energy. Thus, for example, rough-grinding of maize grain on a hammer mill requires about 10 kw per metric ton. To grind whole grain on a Hurrican mill to form a fine flour (smaller than 60 mesh), about 60 kw per metric ton are required. Wet grinding of whole, non-steeped grains or larger fragments does not give an economy of energy as compared with dry grinding processes. The direct gelatinization of coarse grits requires very long liquefaction or saccharification periods and additionally results in reduced yields of alcohol.

THE INVENTION

It is an object of this invention to provide, for the continuous grinding and mixing of starch-containing raw materials for the saccharification, a process which involves less expenditure of energy, operates rapidly and leads to high yields of sugar and alcohol, respectively.

This object is surprisingly accomplished by mashing the material with hot water, pregelatinizing it and then grinding it in the shearing field of a rotor-stator machine having intermeshing radial surfaces. Preferably, a certain amount of enzymes is added from the beginning to the mash in this process so that not only a pregelatinization but also a pre-liquefaction takes place.

Surprisingly, substantially less energy, i.e. only about 7 kw per metric ton of raw material and about 32 kgs. of steam of 95° C. is needed for this wet grinding according to the invention. It has further been found surprisingly that the energy necessary for producing the hot water can still be reduced by using hot stillage for mashing. Astonishingly, the hot wet grinding can be carried out trouble-free with hot stillage without reductions in quality or disturbances of the course of the process taking place thereby.

Wet grinding must be effected according to the invention in the shearing field of a rotor-stator machine having intermeshing radial surfaces because only this permits the rapid, complete and energy-saving grinding process to be carried out. Rotor-stator machines having intermeshing radial surfaces have been described, for example, in German published Patent Application Ser. No. P 29 18 212 and are marketed by applicants under the trade name of "Supraton".

The complete gelatinization and partial saccharification are preferably effected in a second rotor-stator machine having intermeshing radial surfaces, e.g. by the process described in German Offenlegungsschrift (DE-OS) No. P 29 44 483. Addition of further enzymes in this or a further operational step results in complete saccharification.

If use is made of a starting material with different grain sizes such as maize, maize grit and maize meal, this may result in difficulties with respect to the viscosity due to the differents rates of pregelatinization and pre-liquefaction. In these cases, it has been found to be advantageous to screen the material previously and then introduce it into the process by initially adding the coarse pieces (maize grains, cereal grains, etc.), then the medium grain sizes (maize grit, grit, etc.) and only then the small grain sizes (meals and flours).

Preferably the starch-containing material is preheated before being mashed. Preheating is preferably effected by heat exchange of otherwise non-utilized waste heat to temperatures of 60° to 100° C. and preferably 80° to 90° C. The hot water is also added at temperatures of 70° to 100° C. and preferably 90° to 95° C. so that the total mixture has a temperature in the range from 80° to 95° C. and preferably in the range from 85° to 93° C. At these temperatures, rapid pregelatinization and, in the presence of enzymes, already a substantial pre-liquefaction take place. Periods of 0.2 to 3 hours are sufficient depending on the grain size. In practice, periods of 0.8 to 2 hours can be readily maintained and lead to excellent results.

The enzymes may be the conventional enzymes for the digestion of starch such as the alpha amylases, especially the temperature-insensitive alpha amylase from Bacillus licheniformis. Moreover, amyloglucosidases may already be present. In practice, it may be sufficient to utilize the enzyme content of the hot stillage for the pre-gelatinization and pre-liquefaction. However, if desired, further amounts of enzymes may still be added unhesitatingly.

The process of the invention will be illustrated in greater detail in the examples which follow.

EXAMPLE 1

50 Metric tons per hour of whole maize grains are preheated in a heat exchanger to 80° C. and mashed with 117 cu.m./hr. of stillage/enzyme having a temperature of 95° C. in a mixing screw. The mixing temperature is 90° to 92° C. The mixture is introduced from the screw directly into the shearing field of a rotor-stator machine having intermeshing radial surfaces (Supraton machine) and ground. The requirement of electric energy for soaking and gelatinization is 350 kw. Moreover, about 1 metric ton/hr. of steam of 95° C. is needed.

The effluent solution is directly introduced into a second rotor-stator machine having intermeshing radial surfaces and is completely gelatinized therein according to Patent Application Ser. No. P 29 44 483.

EXAMPLE 2

42.5 Metric tons/hr. of maize grits and maize meal are preheated to 80° C. and mashed with 100 cu.m./hr. of stillage/enzyme at 95° C. in a mixing screw. The mixing temperature is 91° C., the residence time 0.5 to 2 hours and preferably exactly 1 hour. The consumption of electric energy for soaking and gelatinization is 62 kw. The consumption of steam of 95° C. is approximately 900 kgs./hr. When operating in this manner, the maize grits are charged to the front part of the screw and the maize meal only at the end directly before the introduction into the Supraton machine. Further processing is effected as described in Example 1.

What is claimed is:

1. A process for continuously grinding and mixing starch-containing raw materials for saccharification, characterized in that the material is mashed with hot water having a temperature of 70°–100° C., pre-gelatinized for 0.2–3 hours at a temperature of 80°–95° C. and then ground in the shearing field of a rotor-stator machine having intermeshing radial surfaces.

2. A process according to claim 1, characterized in that enzymes are added to the mash from the beginning thereby pre-liquefying it.

3. A process according to claim 1 or 2, characterized in that hot stillage is used as hot water.

4. A process according to one of claims 1 to 3, characterized in that raw materials having largely different grain sizes are screened and initially the large and then the medium and finally the small grain sizes are introduced into the process.

* * * * *